(12) United States Patent
Janssen

(10) Patent No.: US 8,029,639 B2
(45) Date of Patent: Oct. 4, 2011

(54) METHOD OF JOINING A PAIR OF TUBULAR ENDS

(75) Inventor: Franciscus Antonius Henri Janssen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 32 days.

(21) Appl. No.: 12/305,557

(22) PCT Filed: Jun. 18, 2007

(86) PCT No.: PCT/EP2007/055990
§ 371 (c)(1),
(2), (4) Date: Jan. 2, 2009

(87) PCT Pub. No.: WO2007/147793
PCT Pub. Date: Dec. 27, 2007

(65) Prior Publication Data
US 2010/0007141 A1    Jan. 14, 2010

(30) Foreign Application Priority Data
Jun. 20, 2006   (EP) .................................... 06115727

(51) Int. Cl.
*B29C 65/54* (2006.01)
(52) U.S. Cl. .................... 156/304.3; 156/304.2; 285/419
(58) Field of Classification Search .............. 156/304.2, 156/304.3, 304.4; 285/419
See application file for complete search history.

(56) References Cited

U.S. PATENT DOCUMENTS

| | | | | |
|---|---|---|---|---|
| 1,865,669 A | * | 7/1932 | Bostwick | 156/122 |
| 3,757,827 A | | 9/1973 | Seiwert et al. | 138/109 |
| 4,234,368 A | * | 11/1980 | Schwarz | 156/91 |
| 4,310,372 A | * | 1/1982 | Janssen et al. | 156/245 |
| 4,449,038 A | * | 5/1984 | Reich et al. | 219/535 |
| 4,610,740 A | * | 9/1986 | Nordstrom | 156/79 |
| 4,876,041 A | * | 10/1989 | Hanselka | 264/571 |
| 5,823,581 A | * | 10/1998 | Coppolo | 285/373 |
| 6,059,319 A | * | 5/2000 | Wyke | 285/21.2 |
| 6,364,367 B1 | * | 4/2002 | Hintzen | 285/21.1 |

FOREIGN PATENT DOCUMENTS

| | | |
|---|---|---|
| DE | 1750031 | 9/1971 |
| FR | 1463952 | 12/1966 |
| GB | 2219057 | 11/1989 |
| GB | 2258899 | 2/1993 |
| WO | WO 2005017006 A1 * | 2/2005 |

OTHER PUBLICATIONS

International Search Report dated Sep. 21, 2007 (PCT/EP2007/055990).

* cited by examiner

*Primary Examiner* — Philip Tucker
*Assistant Examiner* — Nickolas Harm
(74) *Attorney, Agent, or Firm* — William E. Hickman

(57) ABSTRACT

A method of joining a pair of tubular ends (1, 2) comprises: providing the tubular ends with intermeshing tapered edges (3, 4); joining the tubular ends by inserting an adhesive between the tapered edges and pressing the tapered edges (3, 4) together; arranging an axial load carrier collar (5) around the joined tubular ends; inserting an adhesive between the inner surface of the collar (5) and the outer surfaces of the joined tubular ends (3, 4); and inducing the adhesive to bond the inner surface of the collar (5) to the outer surfaces of the joined tubular ends. The axial load carrier collar (5) may be equipped with a series of flexible reinforcement strips (8, 9), which carry a majority of axial loads exerted on the tubular joint, such that only a minimal axial load is exerted on the bonded tapered edges (3, 4).

8 Claims, 1 Drawing Sheet

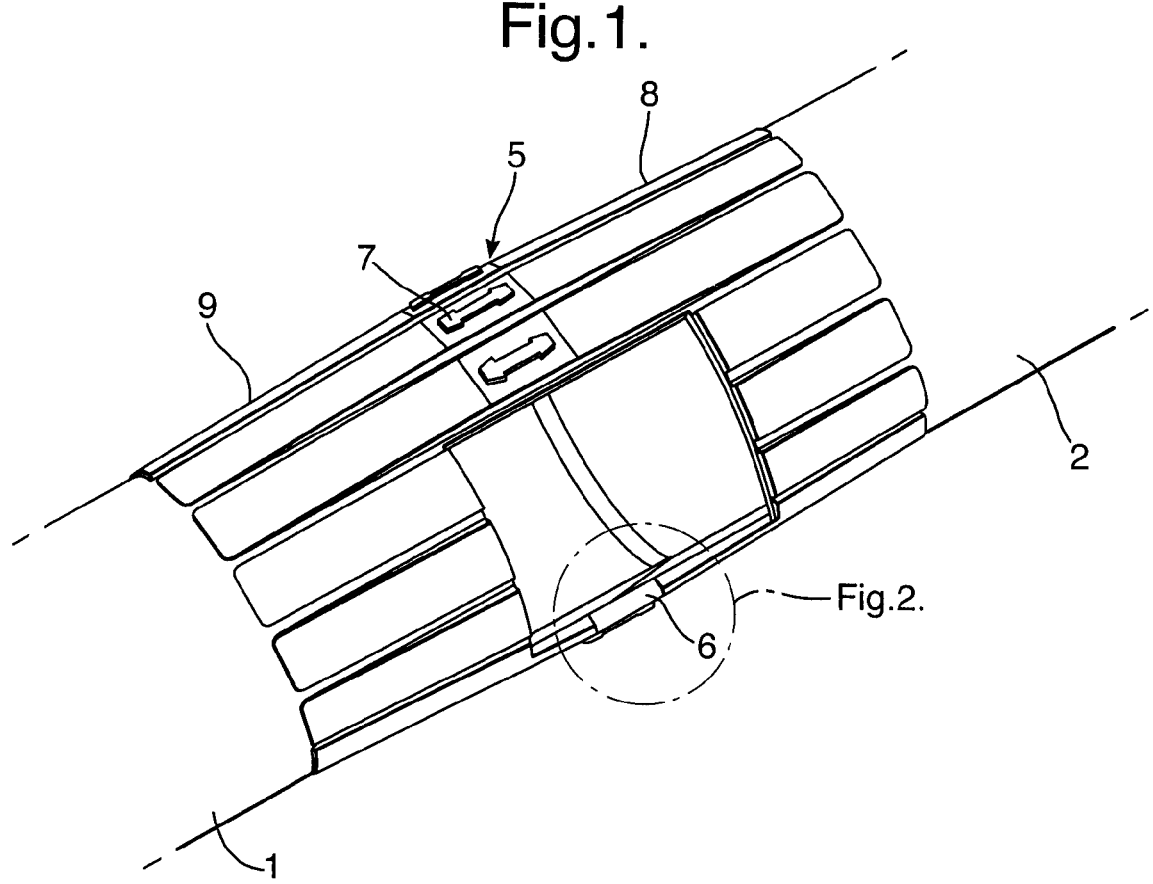
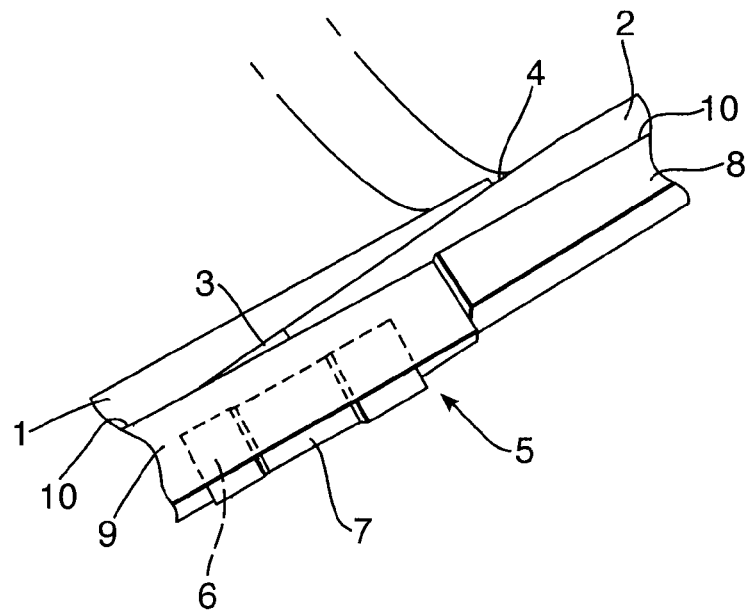

METHOD OF JOINING A PAIR OF TUBULAR ENDS

PRIORITY CLAIM

The present application claims priority of European Patent Application No. 06115727.7 filed 20 Jun. 2006.

FIELD OF THE INVENTION

The invention relates to a method for joining a pair of tubular ends.

BACKGROUND OF THE INVENTION

It is known to join a pair of tubular ends by flanges that are bolted together or by welding, brazing or bonding a pair of co-axial tubular ends together. If the tubular ends are bonded together by an adhesive then the bonded co-axial tubular joint is relatively strong in radial direction since hoop stresses are distributed over the co-axial tubular ends, but is relatively weak in longitudinal direction, since longitudinal forces generate shear forces in the relatively weak bonding region.

SUMMARY OF THE INVENTION

It is an object of the present invention to provide a method of joining a pair of tubular ends by an adhesive such that this problem is alleviated and a bonded tubular joint is created, which has an enhanced strength in longitudinal direction in comparison to conventional bonded joints of co-axial tubular ends.

In accordance with the invention there is provided a method of joining a pair of tubular ends, the method comprising:
  providing the tubular ends with intermeshing tapered edges;
  joining the tubular ends by inserting an adhesive between the tapered edges and pressing the tapered edges together;
  arranging an axial load carrier collar around the joined tubular ends;
  inserting an adhesive between the inner surface of the collar and the outer surfaces of the joined tubular ends; and
  inducing the adhesive to bond the inner surface of the collar to the outer surfaces of the joined tubular ends.

BRIEF DESCRIPTION OF THE DRAWINGS

FIG. 1 is a schematic three-dimensional view of a pair of tubular ends that are joined by the method according to the invention, in which part of the joint has been cut away to provide an axial sectional view of details of the joint FIG. 2 is an enlarged three-dimensional view of the encircled section of the axial sectional view of the details of the joint shown in FIG. 1.

DETAILED DESCRIPTION OF THE INVENTION

In its most simple form, the collar consists of 2 strips, connecting the tubular ends. The strips simply connect the two ends and take up any axial forces. The strips are glued onto the tubular ends.

In general the width of each strip in the collar is at most 30% of the outer diameter of the tube, more suitably at most 25%, even more suitably at most 20%, preferably at most 15%. More preferably the strip width is between 10 and 2.5% of the tube outer diameter. Thus, in the case of a tube outer diameter of 25 cm (10 inch), the strip width is preferably less than 3.75 cm, more preferably between 2.5 cm and 0.625 cm. The outer diameter of the tubes may vary from 15 cm to 125 cm, or even more.

The total length of a strip is suitably between half of the outer diameter and twenty times the outer diameter of the tube, more suitably between the diameter and ten times the diameter of the tube. Preferably the length of the strip is between two times the diameter of the tube and 5 times the diameter of the tube. Thus, for a 50 cm outer diameter tube the total strip length is preferably between 1 and 5 meter.

As indicated above, the minimum number of strips in the collar is two. These two strips, in order to withstand the highest axial loads, are to be fixed more or less opposite each other onto the tube. Suitably the collar contains at least three strips, more suitably at least four even more suitably at least 6. These three, four or six strips preferably are fixed at angles of 120°, 90°, respectively 60° with respect to the central ax of the tube. Preferably the strips are adjacent to each other or there are small openings between adjacent strips. The distance between two strips is suitably less than twice the width of strips, preferably less than the width of a strip, more preferably less than half of the width of a strip, even more preferably less than a quarter of the strip width.

The thickness of the strip is suitably between 30% of the thickness of the tube and three times the thickness of the tube. Preferably the thickness of the strip is between 50% of the thickness of the tube and twice the thickness of the tube, more preferably the same thickness as the tube. Thus, in the case of a 50 cm outer diameter tube made out of 20 mm thick steel, the thickness of the strip is preferably between 10 and 40 mm, more preferably about 20 mm. The strip may have the same thickness over the whole strip, it is also possible decrease the thickness to the end of the strip. For instance a strip of 1 meter long and having a width of 4 cm may have a thickness of 3 mm at both ends, increasing to 20 mm at the centre. Suitably the thickness of the strip continuously decreases from the centre to the end, and the thickness at the ends is between 5 and 25% of the thickness at the centre.

In a preferred embodiment the strip comprises two parts, connected to each other by a connection element. The strip is especially made of the similar parts. Each part is connected (glued) to a tube end, and by connecting (gluing) the tapered tube ends to each other the strip ends are placed in a position at which they can be connected to each other. The advantage of two-part strips is that each part can be attached to a tube end with a relatively thin layer of glue. Any differences in tube diameter will be solved by the connection element. For instance, in the case of a difference in tube diameter of 5 mm, at each side of tube there will be a gap of 2.5 mm at each side. Both parts of the strip can be glued to the tube ends, using a glue layer thickness of e.g. 0.2 mm. Such a connection results in a strong bonding. In the case of a strip thickness of e.g. 20 mm, a connection element of 17.5 mm (or more) may connect both ends of the strip. In this way there is no need for a (weak) glue layer of 2.5 mm in the case that one long strip would be used.

In a preferred embodiment the strips are connected to each other for instance by a textile or polymer tape at the upper side of the strip. Also flexible connection may be used to connect the sides of adjacent strips, e.g. small polymer blocks or small springs. In that way a long band of parallel strips may be made. This band can be cut at the desired length (especially the radius of the tube end) and applied to one tube end. After connecting the two tube ends the strips can be also be applied to the other tube end. After connecting the two tube ends the strips can be also be applied to the other tube end. It is also possible to connect the tube ends and the remaining ends at the same time. In another embodiment the band of strips are applied onto the already connected tube ends. Please note that all strips are preferably arranged parallel to the central axis of the tubes.

In the case that the strip is to be made of two similar parts that are connected to each other, the parts may be connected to each other in the same way as described above. A band of parts may be glued onto one tube end, the two tube ends may be connected to each other and the second band of parts may be connected to the other tube end, followed by applying the connection parts. Other ways of application, e.g. as one strip, are also possible.

Preferably, the strips are made of the same material as the material of the tubes, e.g. the strips and the tubes are made of steel, especially stainless steel. In that case any tension due to thermal expansion will not occur.

It is preferred that the axial load carrier collar comprises slots, which are substantially parallel to a longitudinal axis of the joined tubular ends.

The collar may comprise a series of strips, which interconnected by a carrier ring and are separated by the slots and are oriented in a direction substantially parallel to the longitudinal axis of the joined tubular ends.

The carrier ring may be of a chain type and comprise I-shaped locking elements and the series of strips may comprise two arrays of reinforcement strips, which each have a T-shaped recess at one end thereof, such that two T-shaped recesses of adjacent reinforcement strips may be locked around an I-shaped locking element.

The adhesive inserted between the inner surface of the collar and the outer surfaces of the joined tubular ends may be reinforced by a glass fiber cloth.

The tubular ends may be made of steel and may form part of a pair of steel oilfield tubulars.

These and other features, advantages and embodiments of the method according to the invention are described in the accompanying claims, abstract and the following detailed description of a preferred embodiment, in which reference is made to the accompanying drawings.

FIG. 1 and FIG. 2 show a pair of tubulars 1 and 2 that are provided with intermeshing co-axial tapered edges 3 and 4 between which an adhesive is injected to provide a bond which is suitable to provide a seal and to transfer hoop stresses from the outer surface of the inner tapered edge 3 to the outer tapered edge 4.

In order to reinforce the tubular joint in a longitudinal direction an axial load carrier collar 5 is arranged around the joint.

The collar 5 comprises a carrier ring 6 on which a series of I-shaped locking elements 7 are mounted. The collar 5 further comprises two arrays 8 and 9 of reinforcement strips, which each comprise a T-shaped cavity that fits around about half of an I-shaped locking element 7. The inner surfaces of the reinforcement strips 8 are bonded to the outer surfaces of the tubulars 1 and 2 by an adhesive in which a glass fiber cloth 10 may be arranged.

The method according to the invention may be applied to join by means of adhesive bonding steel tubulars 1 and 2 having an outer diameter in the range from 15 cm to 1 m (6" to approx. 36") or even larger (e.g. up to 1.25 m (50")), for the construction of flow lines and pipelines as used in the oil and gas industry.

The tubulars may in general be used for the transport of fluids i.e. liquids and gasses such as water, crude oil, methane gas and so on.

The tubulars to be joined may in general be pipes as supplied by steel mills and may have the typical tolerances of steel pipes as used in and specified for the oil and gas industry.

The pipe material can be carbon steel or any corrosion resistance alloy, eventually the method can also be used for polymeric or ceramic based pipes.

Before the tubulars 1 and 2 are joined they need at the ends a surface preparation, like blast cleaning, power tool cleaning, solvent wipe or any other cleaning method to obtain sufficient cleanliness and anchor profile for the adhesive used. A special tool can be used to remove the out of roundness of the steel tubular ends to be joined before taking and further actions, when required.

The tubular ends 3 and 4 may be machined to obtain a taper-taper connection 3,4.

The gap between the taper-taper connection 3,4 will be filled with a special adhesive that also acts as a seal. The purpose of the taper-taper connection 3,4 is to hold the hoop stresses generated inside the tubulars 3 and 4 by the fluids. In general, the adhesive can be an epoxy, polyurethane or any other polymeric adhesive deemed suitable for the application.

The axial forces acting on the tubulars 3 and 4 are predominantly carried by the collar 5 comprising a metal or composite material carrier ring 6 and two arrays 8 and 9 of flexible fingers on each side of the joint.

The flexibility of the fingers 8 and 9 is required to control the bondline thickness of the adhesive and to accommodate the tolerance in of the individual tubulars 1 and 2. The strength of an adhesive joint is reduced with increasing bondline thickness and as such to obtain the required strength needs to be controlled.

The bondline thickness can further be controlled be placing a thin glass fiber cloth under the arrays of fingers 8 and 9. The carrier ring 6 may be flexible or be provided as a chain that can be wrapped around the tubulars 1 and 2. The chain can be cut to length depending on the diameter of the tubulars 1 and 2 to be joined.

It will be understood that advantages of the method according to the invention are that it allows:

joining of large steel tubulars 1 and 2 using adhesive bonding;

separation of the functions hoop stress and axial stress carrying capability;

use of arrays of flexible fingers 8 and 9 on a carrier ring 6 to control bond line thickness between the reinforcement collar 5 and the tubulars 1 and 2; and use of a chain type carrier ring 6 to provide an axial load carrier collar 5 suitable for different diameters.

The collar as mentioned in claim 1 preferably comprises two or more elongated, parallel strips, especially at least 3, more especially at least 4, even more especially at least 6, the strips suitably connected to each other in a flexible way. In a preferred embodiment each strip is made up of two similar parts, each part connected to one tube end and the two parts connected by a connection means. In the case of two part strips, these parts may be flexibly connected to each other to form a string. Two strings, together with the connection means will form the collar.

The invention claimed is:

1. A method of joining a pair of tubular ends, the method comprising:

providing the tubular ends with intermeshing tapered edges;

joining the tubular ends by inserting an adhesive between the tapered edges and pressing the tapered edges together;

arranging an axial load carrier collar around the joined tubular ends;

inserting an adhesive between the inner surface of the collar and the outer surfaces of the joined tubular ends; and inducing the adhesive to bond the inner surface of the collar to the outer surfaces of the joined tubular ends, in which method the collar consists of at least two strips, each strip comprising two parts, the parts connected to each other by a connection element.

2. The method of claim 1, wherein the axial load carrier collar comprises slots, which are substantially parallel to a longitudinal axis of the joined tubular ends.

3. The method of claim 2, wherein the axial load carrier collar comprises a series of strips, which are separated by the slots and are oriented in a direction substantially parallel to the longitudinal axis of the joined tubular ends.

4. The method of claim 3, wherein the strips are interconnected by a carrier ring.

5. The method of claim 4, wherein the carrier ring comprises the connection element in the form of l-shaped locking elements and two arrays of reinforcement strips are provided, which each have a T-shaped recess at one end thereof, such that two T-shaped recesses of adjacent reinforcement strips may surround an l-shaped locking element.

6. The method of claim 1, wherein the adhesive inserted between the inner surface of the collar and the outer surfaces of the joined tubular ends is reinforced by a glass fiber cloth.

7. The method of claim 1, wherein the tubular ends are made of steel.

8. The method of claim 7, wherein the tubular ends form part of a pair of steel oilfield tubulars.

* * * * *